Patented May 17, 1932

1,859,262

UNITED STATES PATENT OFFICE

JOSEPH A. SHAW, OF PITTSBURGH, PENNSYLVANIA

TREATMENT OF HYDROCARBON OIL

No Drawing.    Application filed November 6, 1928.   Serial No. 317,699.

This invention relates to the treatment of hydrocarbon oil to remove impurities such as unsaturated organic compounds, acid substances, and the like.

The removal of such impurities from hydrocarbon oils, such as, for example, light oils removed from coal gas, oils produced in the distillation of tar, petroleum oils, and the like, is generally accomplished by first treating the oil with sulphuric acid whereby a polymerization of such impurities or some analogous reaction is effected, and removing the polymerized materials and the like, and then washing the oil with an alkaline liquid to remove acid substances remaining in the oil after the initial treatment of acid. Such substances may comprise small amounts of the sulphuric acid itself, sulphonic acids, and the like.

The alkaline agent generally employed in the past has been a solution of sodium hydroxide. However, it has been proposed to employ for this purpose a solution containing an alkali and an alkali salt of a tar acid; for example, a solution containing approximately equal parts of sodium hydroxide and sodium phenolate.

There are a number of advantages in such procedure, not the least of which is the fact that this treatment appears to result in an improved quality of the oil after treatment with regard to color, purity, and the like. Moreover, it has been found that a process for removing phenol from still waste or other ammoniacal liquor produced by a gas plant can be advantageously operated to produce such a solution as an end product, and even in substantially the proper amount that is required for the treatment of the light oil normally removed from the coal gas produced in the same plant.

After such a solution has been employed for the treatment of the hydrocarbon oil in the manner of the prior art, it naturally contains a considerable amount of alkali sulphates, sulphonates and other analogous products of neutralization of the acid substances present in the oil treated. The solution also contains a considerable amount of tar acids or their compounds.

The presence of the former is undesirable where the solution after treatment of the oil is to be used for any purpose in which its essentially alkaline nature is to be utilized; for example, it has been proposed to employ this solution to supply the necessary alkali for a known process of gas purification that comprises the treatment of the gas with an alkaline solution for removal of acidic impurities from the gas.

After the liberation of the tar acid, by carbon dioxide or in an analogous manner, the solution contains principally sodium carbonate, which is the active alkaline element desired. In gas purification processes of the character indicated, the sodium phenolate solution may be added directly to the gas purification liquid, which contains sufficient sodium bicarbonate to "spring" the tar acid and produce sodium carbonate.

Such additional substances as sulphates and sulphonates that may be present in the added solution are inert with respect to the reactions involved in such a process, and their presence is decidedly undesirable as is the accumulation of any inert material in such a system.

On the other hand, the tar acid content of the solution is not disadvantageous with respect to the use of the solution in a gas purification process of the character indicated, and it has even been found that the presence of phenol in such a system may be decidedly beneficial.

It may of course be desired to operate in such a manner that substantially all of the tar acid is first recovered and the resultant substantially tar acid-free solution may then be employed for either gas purification process or for water softening, or the like. In such instance, also, the presence of inert materials in the solution after tar acid removal in considerable amount is undesirable.

If on the other hand the alkaline solution after treatment of the oil is merely to be discarded, the presence of tar acids renders this impractical or impossible by reason of the fact that modern legislation has imposed general restrictions upon discharging any effluent matter containing tar acids into bodies of water subsequently used for drinking purposes.

As will be apparent, the procedure above recited has advantages that make it well worth while, but it is subject to certain disadvantages which impair its utility to a certain extent, unless suitable provisions are made.

An object of the present invention is to overcome such disadvantages by providing an improved process of the character described in which the tar acids or their compounds and the inert products of neutralization are largely separated.

A further object of my invention is to provide a process of the character described which results in a solution containing the bulk of the inert products of neutralization, but substantially free from tar acids.

A further object of my invention is to provide a process of treating hydrocarbon oil with such a solution in which there is also produced a solution containing the bulk of the tar acid ordinarily present in a solution employed for washing the oil but containing only very limited amounts of inert products of neutralization.

My invention has for further objects such other operative advantages or results as may hereinafter be found to obtain.

My invention contemplates the usual treatment of the hydrocarbon oil to be purified by washing it with sulphuric acid in the usual manner. The oil is agitated with the appropriate quantity of acid for the required time, and the resultant aqueous layer containing the bulk of the excess acid and the polymerized hydrocarbon impurities is withdrawn in the form of a sludge and either discarded or treated in any suitable manner.

As above recited, the oil now contains appreciable amounts of acid impurities comprising principally sulphonic acids and usually some of the excess sulphuric acid itself. For the purpose of removing these acid impurities, I employ a solution of alkali and an alkali salt of a tar acid; for example, a solution of sodium hydroxide and sodium phenolate.

According to my invention, I accomplish this treatment of the oil in two stages, using in the first stage an amount of the washing solution which is not quite sufficient to completely neutralize the acid substances contained in the oil. The oil is agitated with this amount of the solution in the usual manner. The free alkali in the solution first reacts with the acid substances in the oil until it is exhausted and the tar acids present are then liberated by a portion of the remaining acid substances in the oil. The liberated tar acids are substantially entirely dissolved in the oil being treated.

After agitating and settling, the resultant slightly acid aqueous layer is withdrawn. It comprises a solution of free acid, sodium sulphate, sodium sulphonates and the like, but is substantially free from tar acid.

After this initial treatment the oil contains some unneutralized acid substances together with substantially all of the tar acid originally contained in the initial washing liquid.

The oil is then treated with a further quantity of the washing solution containing alkali and alkali salt of tar acid as before, in sufficient amount to complete the neutralization of the remaining acid substances present in the oil after the acid washing treatment and also the tar acids contained by the oil after the first alkaline washing stage.

After agitation and settling, the aqueous layer is drawn off as before, but is not allowed to mingle with the aqueous liquid withdrawn after the first alkaline washing stage.

This aqueous liquor withdrawn after the second alkaline washing stage comprises a solution containing principally sodium salts of tar acids, but only very limited amounts of sodium sulphate and analogous products of neutralization, and may also contain small amounts of unconsumed sodium hydroxide.

By reason of the fact that the solution withdrawn after the first stage contains substantially no tar acids, it may readily be discarded or utilized in any manner without the difficulty which would otherwise be necessitated by the presence of tar acids or tar acid compounds therein.

By reason of the fact that the solution withdrawn from the second alkali washing stage contains only a very small amount of inert products of neutralization, it may readily be employed without disadvantage for use in gas purification, water softening, or for any other purpose with or without preliminary liberation of tar acids, as the situation may require. Moreover, by reason of the fact that it contains substantially all of the tar acid originally contained in all of the solution used for the first and second alkaline washing treatments, it may be treated with comparative ease for the recovery of the tar acid when so desired.

In general I prefer to employ for the alkaline washing stages a solution containing substantially equal parts of sodium hydroxide and sodium phenolate or sodium salts of other tar acids, but this ratio need not be adhered to and will in fact vary considerably in different plants, as will be evident from the above description.

It is in general desirable to employ a sufficient excess of alkali in the phenol removal plant to insure that the resultant solution of alkali and alkali tar acid compound is sufficient in amount to satisfy the washing requirements for the light oil normally recovered from the gas made in the same plant, and the requirements of one plant may differ considerably from those of another. In one plant, this procedure required that the alkaline solution leaving the phenol removal plant be only 35% saturated with respect to tar acids.

It is desirable and in many circumstances necessary for the solution to have a sufficient concentration of free alkali to make it possible to recapture in the second stage all of the tar acid transferred to the oil in the first stage, without the employment of excessive amounts of washing solution, unless such amounts are produced as a matter of course in the operation of the phenol removal process in the same plant.

The actual amounts of alkaline tar acid solution employed for washing in the first and second stages are determined by the operator in accordance with the desired quality of product. Consequently, no specific figures would be of value as in each case the total quantities necessary and the quantities necessary in the first and second stages will vary according to the character of the oil, and also the nature of the acid washing stage.

It is important if substantially complete freedom from tar acid in the effluent from the first alkaline washing stage is desired that this first stage should fall a little short of complete neutralization of the acid impurities in the oil, in order that there will be a sufficient amount of acid impurities over and above the amount neutralized by the free alkali to effect the substantially complete "springing" of the tar acid from its alkali compound.

However, if for any reason it is more desirable that the effluent from the second stage should contain no sodium sulphate or the like than that the effluent from the first stage should be substantially free from tar acid, then the initial stage may be carried to a point where substantially complete neutralization of the acid impurities in the oil is effected.

The term "tar acid" as used herein refers not only to phenol alone, but to cresol and analogous substances designated generally under this heading.

While my invention has been described hereinabove with respect to certain illustrative examples, it is not limited to such specific examples, but is to be construed as of the scope of the claims hereinafter made.

I claim as my invention:—

1. The process of removing acid substances from hydrocarbon oil after treatment thereof with sulphuric acid which comprises washing said oil with a solution of a salt of a tar acid and an alkali-forming metal, and containing free alkali, in two stages, the solution used in the first stage being just insufficient to completely neutralize the acid substances present in said hydrocarbon oil, and said solution being removed from the oil prior to the second stage, and the solution used in the second stage being sufficient to complete said neutralization and to remove substantially all tar acid derived by said oil in said first stage.

2. The process of removing acid substances from hydrocarbon oil after treatment thereof with sulphuric acid which comprises washing said oil with a solution of sodium hydroxide and sodium phenolate, in two stages, the solution used in the first stage being just insufficient to completely neutralize the acid substances present in said hydrocarbon oil, and said solution being removed from the oil prior to the second stage, and the solution used in the second stage being sufficient to complete said neutralization and to remove substantially all tar acid derived by said oil in said first stage.

3. The process of removing acid substances from hydrocarbon oil after treatment thereof with sulphuric acid which comprises washing said oil with a solution containing approximately equal parts of sodium hydroxide and sodium phenolate, in two stages, the solution used in the first stage being just insufficient to completely neutralize the acid substances present in said hydrocarbon oil, and said solution being removed from the oil prior to the second stage, and the solution used in the second stage being sufficient to complete said neutralization and to remove substantially all tar acid derived by said oil in said first stage.

4. The process of removing acid substances from hydrocarbon oil after treatment thereof with sulphuric acid, which comprises washing said oil with a solution containing a compound of a tar acid and an alkali-forming metal, said solution being used in amount just insufficient to completely neutralize the acid substances present in said hydrocarbon oil after said treatment with sulphuric acid, removing said solution from contact with the oil and then washing the oil with a solution containing an alkali in amount sufficient to complete the neutralization of said acid substances and to remove substantially all tar acid derived by said oil during said first washing.

In testimony whereof, I have hereunto subscribed my name this third day of November, 1928.

JOSEPH A. SHAW.